Patented Feb. 8, 1949

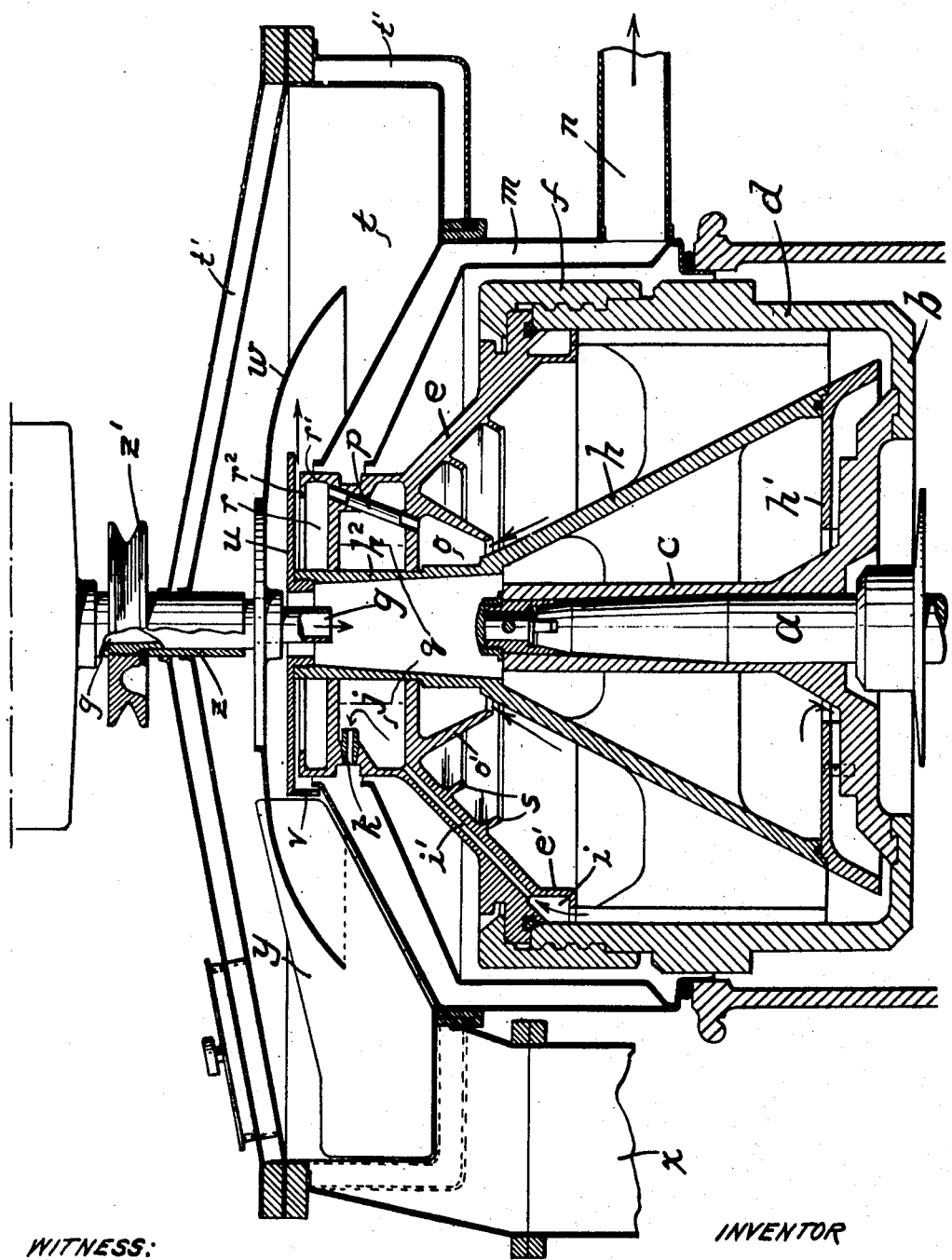

2,461,129

UNITED STATES PATENT OFFICE 2,461,129

CENTRIFUGE FOR THE SEPARATION OF SERUM FROM CHEESE CONSTITUENTS

George J. Strezynski, Chicago, Ill., assignor to The De Laval Separator Company, New York, N. Y., a corporation of New Jersey Application April 20, 1944, Serial No. 531,908

6 Claims. (Cl. 233—28)

In the manufacture of various kinds of cheese, it is customary to take curdled milk or its equivalent, add thereto butterfat in proportions varying from nought to ten per cent. of the total mix, dependent on the kind of cheese to be made, subject the mixture to the action of a homogenizer, and then, by a long established conventional procedure, including a prolonged period of drainage, separate the whey or serum, leaving a product composed mainly of butterfat and milk solids. One of the serious objections to the conventional method of cheese manufacture is that the prolonged time required for the separation of the whey or serum effects physical or chemical changes, or both, that deleteriously affect the flavor, and particularly the keeping qualities, of the cheese.

A primary object of my invention is to produce cheese of superior flavor whose keeping qualities are greatly superior to cheese produced by conventional methods. I have found that if the separation of whey or serum is effected promptly and rapidly after homogenization, the cheese will suffer no deterioration even if kept in storage for a period of time long exceeding that which would normally elapse between the date of manufacture of the marketable product and the dates of its sale and consumption. I have found also that it is practicable to effect rapid separation of the whey or serum by centrifugal force. However, centrifuges of conventional type—whether adapted to separate liquids of different specific gravities, as, for example, in the separation of cream from whole milk, or to separate liquids from solids, whether the solids are heavier or lighter than the liquid, as, for example, in the separation of wax from a chilled soultion of mineral oil and diluent—are not adapted to the separation of the whey or serum from the butterfat and solids constituting the cheese constituents. I have found it necessary, in order to satisfactorily accomplish this purpose, to design a special type of centrifugal separator, and such centrifugal separator, embodying as it does, certain new and useful structural features, forms the subject matter of my invention. The drawing is a vertical sectional view of the improved centrifuge and of auxiliary means for conveying the separated constituents toward their respective ultimate receivers.

The bowl body is of conventional construction and comprises a bottom $b$ having an upright sleeve $c$ for the reception of the driving spindle $a$, a shell $d$ and a top $e$, the latter being secured to the shell $d$ by means of a ring $f$ threaded on the shell $d$ and having a flange overlying the peripheral part of the top.

Inserted within the bowl and rotating therewith is a frusto-conical partition $h$ dividing the interior of the bowl into an inner or central preliminary purifying chamber or distributor of relatively small capacity and an outer annular separating chamber of relatively great capacity. This partition has a neck $h^2$ extending from its upper end. Into this neck extends the lower end of a feed tube $g$. The partition $h$ extends nearly to the bottom of the bowl and has at its lower and wider end an inwardly extending flange $h'$ over the inner edge of which the homogenized mixture of curdled milk, butterfat and solids, after passing through the inner purifying chamber, escapes to and through the annular passage beneath the flange into the outer or separating chamber. Since there is only one outlet from the inner chamber to the outer chamber, substantially the entire mixture fed through the feed tube $g$ enters the outer chamber. If, however, the mixture contains any heavy solid impurities, the mild centrifugal force operative in the inner chamber will effect their separation, and such impurities will accumulate in the angle formed between the partition $h$ and its flange $h'$. The proportion of such impurities is, however, so small that the centrifuge will operate for a prolonged time without excessive accumulation thereof.

In the outer chamber occurs the separation of the whey or serum from the lighter butterfat and solids. The serum is heavier than the cheese constituents and will therefore be thrown to the periphery, while the lighter constituents will be displaced inward. The serum continually escapes at the periphery of the bowl into an annular chamber $i$ enclosed by the upper end of shell $d$, the lower end of top $e$ and a flange $e'$ depending from the top $e$, and thence flows, through a channel or channels $i'$ in the bowl top, into an annular chamber $j$ between the bowl top and the neck $h^2$ of the partition $h$. The upper and lower walls of this chamber extend to and centralize the neck $h^2$ of the partition $h$. The outside diameter of this neck is substantially less than the diameter of the opening at the bottom of the inclined wall $o'$ (hereinafter described), thereby preventing escape of liquid from the chamber $j$ into the chamber ($o$) within wall $o'$. The serum escapes from chamber $j$ through a nozzle $k$ and discharges into a stationary annular receiving pan or trough $m$, whence it flows into a pipe $n$ communicating with the ultimate receiver (not shown) for the serum.

The separated relatively solid cheese constituents, displaced inwardly toward the axis of rotation, are not free flowing. In an ordinary centrifuge, they would accumulate in the central separating zone and clog the discharge. Where, however, the inner zone is bounded by the frusto-conical partition $h$, the cheese constituents will continuously slide along the partition wall and continuously and freely discharge into a chamber $o$ formed by the lower wall of chamber $j$ and a wall $o'$ extending downward therefrom in a direction inclined to the axis of rotation of the bowl.

There is no novelty, broadly, in a centrifuge which contains a partitioning member, providing an inner chamber for preliminary separation of heavier solids, having an inwardly projecting flange under which the mixture flows from the inner chamber to the outer purifying chamber, such construction being known, for example, in purifying bowls of which one is shown in the Leitch Patent No. 1,370,326. The outer or main purifying chamber of such a centrifuge, even if it were provided with an outlet from the outer chamber for separated heavier liquid, would not have the mode of operation above described and would not be adapted for the separation of cheese constituents from whey.

Nor is there any novelty in the broad principle of operation of an inclined partition for facilitating the outflow of a separated constituent. Such a member is disclosed in the Andersson & Dahlgren Patent No. 1,821,607, dated Sept. 1, 1931, which discloses an element, inclined toward the axis of rotation, adapted to facilitate the travel of the lighter separated constituent from the locus of separation inwardly toward the axis of the bowl. In the Andersson et al. contrivance, the inclined element functions both to convey the lighter separated constituent along its outer wall toward the bowl's axis in a direction away from the ultimate discharge outlet and also to convey such constituent along its inner wall away from the bowl's axis, in the opposite direction, toward the ultimate discharge outlet. In my improvement the lighter separated constituent is conveyed along the wall of the partition $h$ in a direction toward the ultimate discharge outlet, into a separate chamber $o$, and thence in the same general direction, along the inner face of the frusto-conical wall $o'$ (forming the outer wall of the chamber $o$) toward the ultimate discharge outlet. The frusto-conical partition $h$ should extend up as high as, or preferably somewhat higher than, the cylindrical part of the bowl shell.

The discharge outlet comprises one or more tubes $p$ extending through the chamber $j$ into a receptacle $r$ located above chamber $j$ and formed by an annular flange $r'$ extending up from the chamber $j$ and having an inwardly extending annular lip $r^2$, over which the separated lighter cheese constituent escapes into a surrounding stationary receiver $t$ supported above the receiving pan $m$.

Extending downward from the bowl top, into the annular V-shaped space between the bowl top and the wall $o'$ are one or more annular flanges forming dams $s$, which, with the conical wall $o'$, arrest the flow of any heavier liquid constituent that may be displaced inward in a shallow stream along the bowl top wall and thus prevent its flow into and discharge with the solids into the chamber $o$. By thus arresting any such inward movement of the heavier liquid it is insured that there shall be a substantially complete discharge of all such liquid through the channels $i'$.

Secured to the top of the neck $h^2$ of the partition $h$ is a cover $u$ which extends over and beyond the receptacle $r$ and narrowly clears the flange $r^2$. The discharging lighter cheese constituent is thus discharged in a fine spray into the chamber $t$.

The temperature of the mixture admitted through the feed tube $g$ should be above 140° F. and below the boiling point of the liquid constituent of the mixture, a temperature of about 180° F. being preferable; and this temperature is maintained, or nearly maintained, within the centrifuge. Because subjection of the mixture to prolonged high temperature may cause chemical changes that may result in irregular operation, the heat should be applied quickly in a continuous heater located near to the centrifuge. It is desirable to maintain heated, although not necessarily or desirably to the temperature within the centrifuge, the receiving pan $t$, and this may be effected by a jacket $t'$ enclosing the receiving pan $t$ and heated by any suitable fluid heating medium. If the pan is thoroughly insulated, the desired temperature will be attained in a few minutes at the start of a run and maintained until the end of the run. Nevertheless, there is a tendency toward clogging just beyond the inner edge of the upper wall of the trough $m$, with resultant danger of diversion of some of the separated cheese constituent into the trough $m$. This is prevented by providing a cutter $v$ that depends from the outer edge of the cover $u$ and prevents any such clogging or shaves away any slight accumulation of cheese that may form in a single revolution of the bowl.

Due partly to the drop in temperature in the receiving pan $t$, but due mainly to the discharge of the cheese in a fine spray into the receiving pan, substantial and desirable aeration of the cheese would occur if no means were provided to prevent it. I have found that the provision of a hood $w$ of restricted diameter extending into the receiving pan $t$ and down below the level of the cheese discharge effectually prevents such aeration.

The separated cheese constituent leaves the receiving pan $t$ through a hole in its bottom, passing thence into a pipe $x$ leading to an ultimate receiver (not shown). In order to sweep the cheese around the receiver into the pipe $x$, there is provided one or more scrapers or conveyors $y$, which are given a slow movement of rotation. Such a conveyor is desirably a wing or vane extending (radially or somewhat backward from a radial line) from the edge of cover $u$ to, and just clearing, the outer wall of the receiving pan $t$ and extending upward from barely above the bottom of the receiving pan $t$. The said movement of rotation may be effected by securing the wing $y$ to the hood $w$ and by securing the hood $w$ to a flange on a sleeve $z$ on the feed pipe $g$. This sleeve may be rotated slowly by a belt (not shown) engaging a pulley $z'$ on said sleeve.

I have found it desirable to locate the chamber $r$ for reception and discharge of cheese above the chamber $j$ for reception and discharge of serum so that the cheese may be discharged into the upper cover, which can be readily equipped with the hereinbefore described mechanism for sweeping the cheese out of the cover and also screened to protect it from oxidation and heat losses. It would be difficult to apply these expedients to the lower cover.

If there is any tendency of the cheese to plug the outlet over the wall o', the decrease of flow through such outlet when the outlet begins to plug causes an increase of flow out of the discharge for the heavier serum; whereupon the level q of liquid in chamber f moves toward the axis and the "slippage" or "runahead" of liquid in chamber f increases. These two effects cause considerably higher pressure on the cheese and free the cheese outlet from clogging cheese.

One great advantage of utilizing my invention in the manufacture of cheese from a prepared mixture of serum, butterfat and solids is that the time required for such manufacture is practically negligible; the product delivered from the receiving pan t being the finished product. Another advantage is that the separation of the serum from the cheese constituents is substantially complete. Another, and perhaps major, advantage is that there is neither time nor opportunity for chemical or physical deterioration of the cheese in the process of expelling the serum, thereby so greatly enhancing the keeping qualities of the finished product that it is edible, without impairment of flavor and with no discoverable deterioration, within a long period of time after its production.

The centrifuge may be utilized in the manufacture of most, if not all, varieties of cheese. Treatment in order to impart to the cheese any characteristic flavor may be in accordance with conventional procedures.

I do not herein claim such of the described improvements as are operative upon the cheese after its separation and discharge from the centrifuge, since such improvements do not necessarily depend for their successful operation upon the use of a centrifuge constructed and operated as herein described. Such improvements form the subject matter of a separate application filed November 10, 1944, Ser. No. 562,786. The claims herein are directed solely to the novel features of the centrifugal separator.

While a centrifuge embodying my invention is primarily intended and adapted for the separation of cheese from serum, it may also be found useful and efficient in the separation of any solids or semi-solids from liquid where the solids are of lower specific gravity than the liquid.

What I claim and desire to protect by Letters Patent is:

1. A centrifuge adapted especially for the separation of cheese constituents from whey or serum of higher specific gravity, comprising a rotatable bowl shell, bottom and inclined top, a frusto-conical member within the bowl and dividing it into an inner chamber for receiving the mixture to be separated and an outer separating chamber, said separating chamber having in its upper portion an outlet for the lighter constituent located near the axis of the bowl, the said frusto-conical member extending from near the bowl bottom and relatively close to the bowl's periphery, in an upward direction inclined to the axis toward said outlet, a third chamber rotatable with the bowl and located above and communicating with said outlet and having an outer wall sloping upward toward the periphery of the separating chamber, said bowl having a peripheral outlet for discharge of the heavier separated constituent, a channel extending along the bowl top and communicating with said peripheral outlet, a fourth chamber above the third chamber rotatable with the bowl and located above the third chamber and communicating with said channel, a receptacle above the fourth chamber having an outlet relatively close to its pheriphery, a channel connecting the outer part of the third chamber and the outer part of said receptacle, the last named channel extending upward and outward throughout its entire length, and openings in the fourth chamber and in said receptacle for the discharge from the centrifuge of the respective separated constituents.

2. A centrifuge adapted especially for the separation of cheese constituents from whey or serum, which comprises a rotatable bowl having a cylindrical body and a top inclined from said body toward the bowl's axis, a frusto-conical partitioning member within the bowl which extends from near the periphery and bottom of the bowl toward the axis and terminates below the level of the upper end of the top, means to feed the mixture of whey and cheese constituents to that zone of the bowl within the partitioning member, there being a passage for conveying the mixture from the zone of the bowl within the partitioning member to the main separating zone of the bowl, outside the partitioning member, wherein the whey is separated from the cheese constituents, a whey-receiving chamber extending above, and a cheese-receiving chamber extending below, the upper end of the bowl top, both chambers being rotatable with the bowl, there being a passage for separated whey along the bowl top from the upper end of the peripheral zone of the separating chamber to the whey receiving chamber, the outer wall of the cheese-receiving chamber extending downward from the bowl top and the whey-receiving chamber and obliquely toward the axis of the bowl and terminating near the upper end of the partitioning member, there being an opening between said wall and the inclined partitioning member through which the separated cheese constituents are adapted to flow from the separating chamber into their receiving chamber, means to discharge the whey from its receiving chamber, and means providing a passage from which the cheese constituents are discharged, said passage extending upward and outward from the receiving chamber for the cheese constituents and terminating above the level of the whey discharge.

3. A centrifuge adapted especially for the separation of cheese constituents from whey or serum of higher specific gravity comprising a rotatable bowl, a frusto-conical member within and rotatable with the bowl providing an inner wall for the separating chamber and extending from its wider end near one end of the bowl and near its peripheral wall toward the axis of the bowl, said separating chamber having a peripheral outlet for the heavier liquid constituent and an outlet for the separated lighter constituent at about the narrow end of said frusto-conical member, three annular chambers located one above another and rotating with the bowl, the middle chamber communicating with the bowl outlet for the heavier constituent and having a discharge outlet, the lower of said three chambers communicating with the bowl outlet for the separated lighter constituent, the upper of said three chambers having a substantially greater diameter than the lower of said three chambers, means providing an upwardly and outwardly extending passage for the separated lighter constituent between the lower and upper of said three chambers, said passage opening into the outer part of said upper chamber, the upper chamber having a discharge outlet for the separated lighter constituent.

4. A centrifuge adapted especially for the separation of cheese constituents from whey or serum of higher specific gravity comprising a rotatable bowl, a frusto-conical member within and rotatable with the bowl providing an inner wall for the separating chamber and extending from its wider end near one end of the bowl and near its peripheral wall toward the axis of the bowl, said separating chamber having a peripheral outlet for the heavier liquid constituent, an inclined wall extending from the top of the separating chamber downward and inward toward said frusto-conical member and spaced therefrom to form an outlet for the lighter constituent at about the narrow end of said frustro-conical member, said inclined wall forming the outer wall of a chamber which communicates with the oulet for the separated lighter constituent and which is provided with an outlet for the discharge of the lighter constituent, said bowl having a frusto-conical top the upper end of which adjoins the upper end of said inclined wall, said inclined wall forming the inner wall of the upper part of the separating chamber, and one or more dams extending downward from the bowl top and adapted to prevent flow into the inner or central zone of the separating chamber of any heavier liquid that may be carried into the upper portion of the separating chamber between the frusto-conical top and said inclined wall.

5. A centrifuge adapted especially for the separation of cheese constituents from whey or serum of higher specific gravity comprising a rotatable bowl, a frusto-conical member within and rotatable with the bowl providing an inner wall for the separating chamber and extending from its wider end near one end of the bowl and near its peripheral wall toward the axis of the bowl, said separating chamber having a peripheral outlet for the heavier liquid constituent and an outlet for the lighter constituent at about the narrow end of said frusto-conical member, said bowl having an annular wall inclined to the axis and extending from and beyond said outlet in a direction inclined away from the axis and forming the outer wall of a chamber communicating with said outlet and adapted to receive therefrom said separated lighter constituent and provided with an outlet for discharge from said chamber of said lighter constituent, a receptacle rotatable with the bowl and communicating with the outlet from the last named chamber, a cover for the receptacle spaced from the upper outer edge thereof to provide a narrow opening through which the lighter constituent is discharged from said receptacle, and a cutter depending from said cover and extending down in front of and outside said opening.

6. A centrifuge adapted especially for the separation of cheese constituents from whey or serum of higher specific gravity comprising a rotatable bowl, a frusto-conical member within and rotatable with the bowl providing an inner wall for the separating chamber and extending from its wider end near one end of the bowl and near its peripheral wall toward the axis of the bowl, said separating chamber having a peripheral outlet for the heavier liquid constituents and an outlet for the separated lighter constituent at about the narrow end of said frusto-conical member, three annular chambers located one above another and rotating with the bowl, the middle chamber communicating with the bowl outlet for the heavier constituent and having a discharge outlet, the lower of said three chambers communicating with the bowl outlet for the separated lighter constituent, means providing a passage for the separated lighter constituent between the lower and upper of said three chambers, the upper chamber having a discharge outlet for the separated lighter constituent, the upper of said three chambers being provided with a wier and a cover for said chamber extending over said wier and beyond the outer wall of said upper chamber to provide a narrow opening forming the specified discharge outlet for the lighter constituent.

GEORGE J. STREZYNSKI.

REFERENCES CITED

The following references are of record in the file of this patent:

UNITED STATES PATENTS

| Number | Name | Date |
| --- | --- | --- |
| 1,370,326 | Leitch | Mar. 1, 1921 |
| 1,821,607 | Andersson | Sept. 1, 1931 |
| 2,216,442 | Lindgren | Oct. 1, 1940 |

FOREIGN PATENTS

| Number | Country | Date |
| --- | --- | --- |
| 260,071 | Great Britain | Oct. 28, 1926 |

Certificate of Correction

Patent No. 2,461,129.  February 8, 1949.

GEORGE J. STREZYNSKI

It is hereby certified that errors appear in the printed specification of the above numbered patent requiring correction as follows:

Column 4, line 41, for the word "desirable" read *undesirable*; column 5, lines 68 and 69, claim 1, for "separating chamber, said bowl" read *bowl, said separating chamber*;

and that the said Letters Patent should be read with these corrections therein that the same may conform to the record of the case in the Patent Office.

Signed and sealed this 16th day of August, A. D. 1949.

[SEAL]

THOMAS F. MURPHY,
*Assistant Commissioner of Patents.*